(12) United States Patent
Tangeman et al.

(10) Patent No.: US 8,585,236 B2
(45) Date of Patent: Nov. 19, 2013

(54) MANUALLY POWERABLE PORTABLE ELECTRIC DEVICE

(75) Inventors: Stanton M. Tangeman, San Francisco, CA (US); William P. Evans, Jr., Oakland, CA (US)

(73) Assignee: Stanton Tangeman, San Francisco, CA (US)

( * ) Notice: Subject to any disclaimer, the term of this patent is extended or adjusted under 35 U.S.C. 154(b) by 0 days.

(21) Appl. No.: 13/507,100

(22) Filed: Jun. 4, 2012

(65) Prior Publication Data

US 2013/0033856 A1    Feb. 7, 2013

Related U.S. Application Data

(60) Provisional application No. 61/515,328, filed on Aug. 5, 2011.

(51) Int. Cl.
| | |
|---|---|
| F21L 13/00 | (2006.01) |
| F21L 13/06 | (2006.01) |
| F02B 63/04 | (2006.01) |
| H02K 7/116 | (2006.01) |

(52) U.S. Cl.
USPC ............ 362/192; 362/200; 362/183; 362/208

(58) Field of Classification Search
USPC .......... 362/192, 200, 183, 193, 119; 320/114, 320/101, 106
See application file for complete search history.

(56) References Cited

U.S. PATENT DOCUMENTS

| | | | |
|---|---|---|---|
| 6,322,233 B1 | 11/2001 | Brandt | |
| 6,914,340 B2 | 7/2005 | Becker | |
| 7,049,708 B2 | 5/2006 | Hartman | |
| 7,400,051 B2 | 7/2008 | Pang | |
| 2004/0090070 A1 | 5/2004 | Eisenbraun | |
| 2006/0245182 A1* | 11/2006 | Lee | ............... 362/192 |

FOREIGN PATENT DOCUMENTS

WO    WO 01/31764 A1    10/1999

* cited by examiner

*Primary Examiner* — Joseph L Williams

(57) ABSTRACT

A manually powered hand held electrical device such as a flashlight is provided. The device has an elongate housing, a power-requiring functional element, a hinge element at the back of the housing, and a crank arm having an end rotatably attached to the hinge. The hinge allows the crank arm to rotate within an arc of 270 degrees between a resting position and an operating position. The arc is within a plane that includes the longitudinal axis of the housing. In the resting position, the crank arm is parallel to the housing; in the operating position, it is orthogonal thereto. The hinge is rotatable about the longitudinal axis of the housing, and consequently so too is crank arm. The hinge is connectable to a generator; rotation of the hinge element powers the generator, and the generator provides power to the power-requiring functional element such as a light-emitting element.

18 Claims, 10 Drawing Sheets

MANUALLY POWERABLE PORTABLE ELECTRIC DEVICE

CROSS-REFERENCE TO RELATED APPLICATIONS

This application claims priority to U.S. Provisional Patent Application No. 61/515,328 of Tangeman and Evans, entitled "Multiple purpose pocket-sized crank arm encasement", as filed on Aug. 5, 2011.

INCORPORATION BY REFERENCE

All publications and patent applications mentioned in this specification are herein incorporated by reference to the same extent as if each such individual publication or patent application were specifically and individually indicated to be so incorporated by reference.

TECHNICAL FIELD

The disclosed invention relates to a portable electrically powered device having a manually operable crank that delivers power to a generator.

SUMMARY OF THE INVENTION

Embodiments of the invention relate to foldable hand crank or arm for a portable electronic device for use in generating power for the device. The device includes a bracket or hinge to which the hand crank arm is pivotally attached, about which the arm is movable between a folded or resting position and an open position in which the arm extends radially outward from the device. The bracket has a channel that receives a portion of the arm when it is moved to the unfolded position and the handle has a hole to permit passage of light when the arm is folded.

Embodiments of the invention include a manually powerable flashlight that includes an elongate flashlight housing that includes a back end, a front end, a longitudinal axis, and a light-projecting element positioned on the front end; a hinge element disposed at the back end of the housing; and a crank arm having a free or unattached end and an attached end, the attached end rotatably attached to the hinge element. The hinge element is operable to allow the crank arm to rotate within an arc of about 270° (270 angular degrees) between a resting position and an operating position, the arc of which is disposed in a plane that includes the longitudinal axis of the housing. The resting position is such that the crank arm is aligned parallel to the housing and the operating position is such that the crank arm is orthogonal to the housing. The hinge element is rotatable about the longitudinal axis of the housing, thereby rendering the crank arm rotatable about the longitudinal axis of the housing. The hinge element is operably connectable to a generator disposed within the housing such that rotation of the hinge element powers the generator, the generator being arranged to power the light-projecting element.

In some embodiments, the crank arm is rotatably stabilizable in the resting position. For example, the crank arm may be rotatably stabilizable in the resting position by a mechanism that engages the arm to the housing, or the crank arm may be rotatably stabilizable in the resting position by a mechanism that engages the attached end arm within the hinge element. Such mechanisms may include snaps, clasps, snap-fit engagements, friction locks, or any conventional means of connection that are easily releasable.

In some embodiments, the crank arm is rotatably stabilizable in the operating position of 270° with respect to the longitudinal axis of the housing. For example, the crank arm may be rotatably stabilizable in the operating position by a mechanism that engages the attached portion of the crank arm within the hinge element. In alternative embodiments, the crank arm may be stabilizable at an angle of 90° with respect to the longitudinal axis of the housing.

In some embodiments, when the crank arm is in an operating position and disposed orthogonal to the longitudinal axis of the housing, the crank arm is rotatable with respect to the longitudinal axis of the flashlight housing. In embodiments wherein the crank arm is stabilizable at an angle of 90° with respect to the longitudinal axis of the housing, the crank arm is also rotatable with respect to the longitudinal axis of the housing.

In some embodiments, the distal end of the crank arm includes an end element which, when the crank arm is in a resting position, covers the light-producing element. In some of these embodiments, the end element of the crank arm includes an opening that allows projection of light from the light-producing element when the crank arm is in a resting position. In some embodiments, the end element serves to protect the light-projecting element from incidental damage.

In some embodiments, the end element of the crank arm includes a mechanism that stabilizes the crank arm in the resting position. The end element may also be attached to the unattached end of the crank arm by a hinged mechanism.

In some embodiments, the crank arm and the housing of the flashlight are substantially of the same length.

In some embodiments, the hinge element includes a stabilizing channel that laterally embraces the crank arm, the crank arm being rotatable within the channel. The stabilizing channel supports the crank arm contained therein, by distributing force imparted to the crank arm during its rotation by a user.

Embodiments of the flashlight housing are sized and configured to be ergonomic. Housing embodiments fit comfortably within the "holding hand" of a user, and the crank arm is comfortably operable by the "operating hand". Ergonomic or comfortable, in this context, refers to conditions wherein the user can manually operate the flashlight crank arm with sufficient hand engagement that firm grasps can be made without straining any particular portion of either hand. This ergonomic aspect of the invention makes it advantageous for the housing to be of sufficient size that the housing and the crank arm can be easily gripped. In some embodiments, by way of example, the housing of the flashlight may have a cross sectional area in the range of about 0.36 in$^2$ to about 1 in$^2$. In other embodiments, the cross sectional area of the flashlight may range from about 1 in$^2$ to about 2.5 in$^2$. In still other embodiments, the cross sectional area of the flashlight may be greater than 2.5 in$^2$. The cross sectional profile of embodiments of the flashlight may be of any conventional shape, for example, it may be round, oval, square, or otherwise polygonal. Square or polygonal profiles may have rounded corners. Flashlight embodiments or manually powerable devices, or manually-powerable energy deliver units that may advantageously include embodiments of the crank arm and associated features as described herein, include devices of any size. However devices that may be most advantageously served by the various inventive features described herein are typically devices that are sized so as to be fitted easily into a conventional garment pocket, and generally sized so as to fit fully and easily into the palm of a hand.

In some embodiments, the flashlight further may include a power storage unit to store power, such as a battery, a rechargeable battery, a capacitor, a supercapacitor, or any emerging power storage device, said power deliverable by operation of the crank arm. Further, in some embodiments, the housing may include a USB power port, more particularly a mini-USB port or a micro-USB port. In such embodiments, the crank arm generates power that is deliverable to another device by way of a USB power port. Such devices include any device configured to receive power through USB-based connection, such as, merely by way of example, a cell phone or a USB-based lighting device.

In another aspect, embodiments of the invention include an electrically-powered hand-held device that includes an elongate housing having a back end, a front end, a longitudinal axis, and a power-requiring functional element; a hinge element disposed at the back end of the housing; and a crank arm that includes a free end and an attached end, the attached end rotatably attached to the hinge element. In such embodiments, the hinge element is operable to allow the crank arm to rotate within an arc of about 270° between a resting position and an operating position, the arc disposed in a plane that includes the longitudinal axis of the housing, the resting position being such that the crank arm is aligned parallel to the housing and the operating position being such that the crank arm is orthogonal to the housing. Further, in such embodiments, the hinge element is rotatable about the longitudinal axis of the housing, thereby rendering the crank arm rotatable about the longitudinal axis of the housing. Still further in such embodiments, the hinge element is operably connectable to a generator disposed within the housing such that rotation of the hinge element powers the generator, the generator being arranged to provide power to the power-requiring functional element.

In yet another aspect, embodiments of the invention include a manually-powerable energy storage and delivery unit having an elongate housing that includes a back end, a front end, a longitudinal axis, and a power delivery connector connectable to a power-requiring device; a hinge element disposed at the back end of the housing; and a crank arm having a free end and an attached end, the attached end rotatably attached to the hinge element. In such embodiments, the hinge element is operable to allow the crank arm to rotate within an arc of about 270° between a resting position and an operating position, the arc disposed in a plane that includes the longitudinal axis of the housing, the resting position being such that the crank arm is aligned parallel to the housing and the operating position being such that the crank arm is orthogonal to the housing. In such embodiments, the hinge element is rotatable about the longitudinal axis of the housing, thereby rendering the crank arm rotatable about the longitudinal axis of the housing. Further, in such embodiments, wherein the hinge element is operably connectable to a generator disposed within the housing such that rotation of the hinge element powers the generator, the generator operably connected to the power delivery connector.

BRIEF DESCRIPTION OF THE DRAWINGS

FIG. 5A is a front view. FIG. 5B is a top view. FIG. 5C is a side view. FIG. 5D is a rear view.

FIG. 6A is a front view. FIG. 6B is a side view. FIG. 6C is a rear view.

DETAILED DESCRIPTION

FIGS. 1-10 provide various views of a manually powerable electrical device. Some embodiments of the device take the form of a flashlight, and that is the illustrated embodiment in these figures. However, this is just an example of an embodiment of the invention, and is intended to represent other manually powerable devices that are included in the scope of the invention. In other embodiments, the manually powerable electrical device may be configured as or used as a device that can function to provide power to another electrical device. By way of example, embodiments of the manually powerable electrical device can be used to power a cell phone, in which case power is delivered to the cell phone by way of a USB port.

Figure 1:
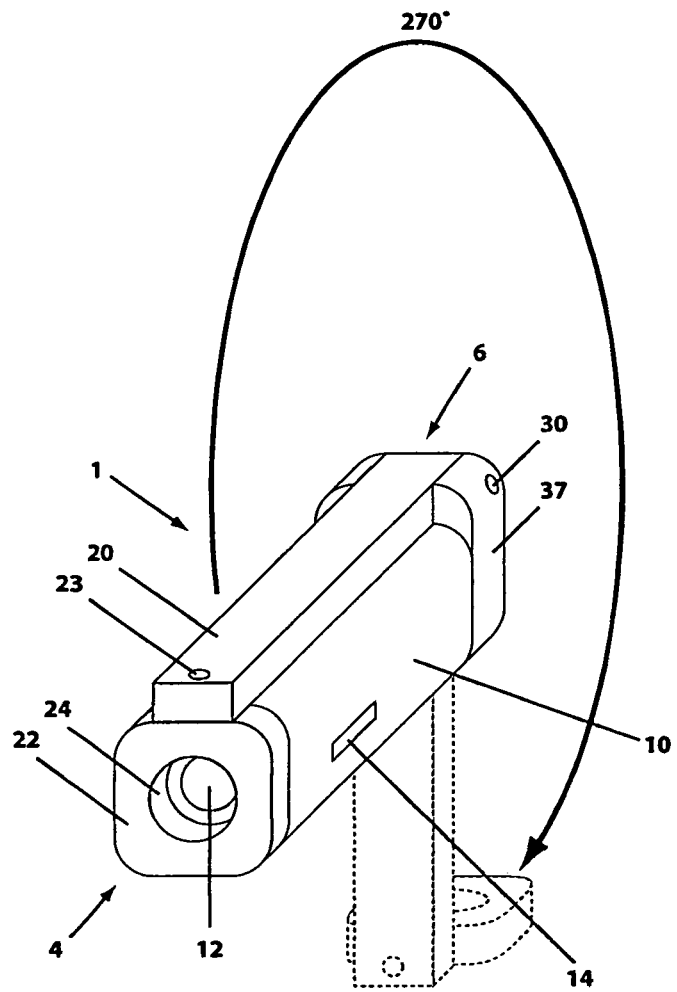
FIG. 1 is a perspective view of an embodiment of the manually powerable flashlight with the crank arm in a resting position.

FIG. 1 is a perspective view of an embodiment of the manually powerable flashlight 1 with the crank arm 20 in a resting position. The flashlight is oriented such that its front end 4 is front and right, and the read end 6 is receding upward on the left. Crank arm 20 is resting along the top of the flashlight housing 10; crank arm 20 is also shown in a ghost rendering as having rotated longitudinally 270° to an operating position. A protective light covering element 22 is disposed at the front end of the crank arm. The cover element 22 is rotatably attached by fastening engagement 23 to the crank arm. This rotatable feature facilitates handling the cranking action of the crank arm when it is in the operating position, as seen particularly in FIG. 10. The cover element includes a through hole 24 which allows a beam of light emanating from lighting element 12 to shine through when the light is activated. Visible at the rear of the flashlight is hinge element 30, which is rotatably connected to the flashlight housing by fastening engagement 37. A USB port 14 is shown on the side of the flashlight housing. This location of USB port 14 as shown is merely illustrative; a USB port may be positioned at any suitable location on the housing, including the front, proximate the lighting element.

Figure 2:
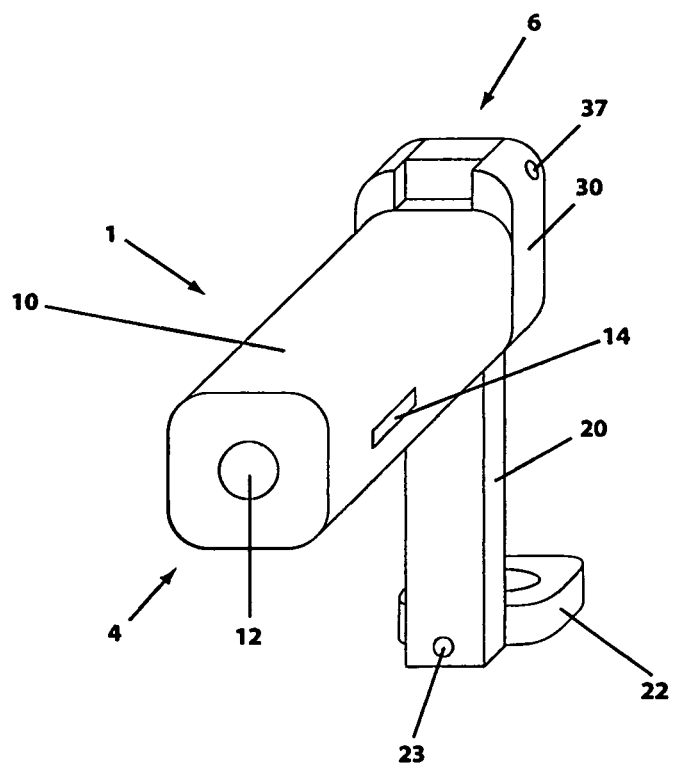
FIG. 2 is a perspective view of an embodiment of the manually powerable flashlight with the crank arm in an operating position.

FIG. 2 is a perspective view of an embodiment of the manually powerable flashlight 1 with the crank arm 20 in an operating position, longitudinally rotated to about 270° from its resting position. This is a solid rendering of the crank arm 20, as shown in the ghosted aspect of FIG. 1.

Figure 3:
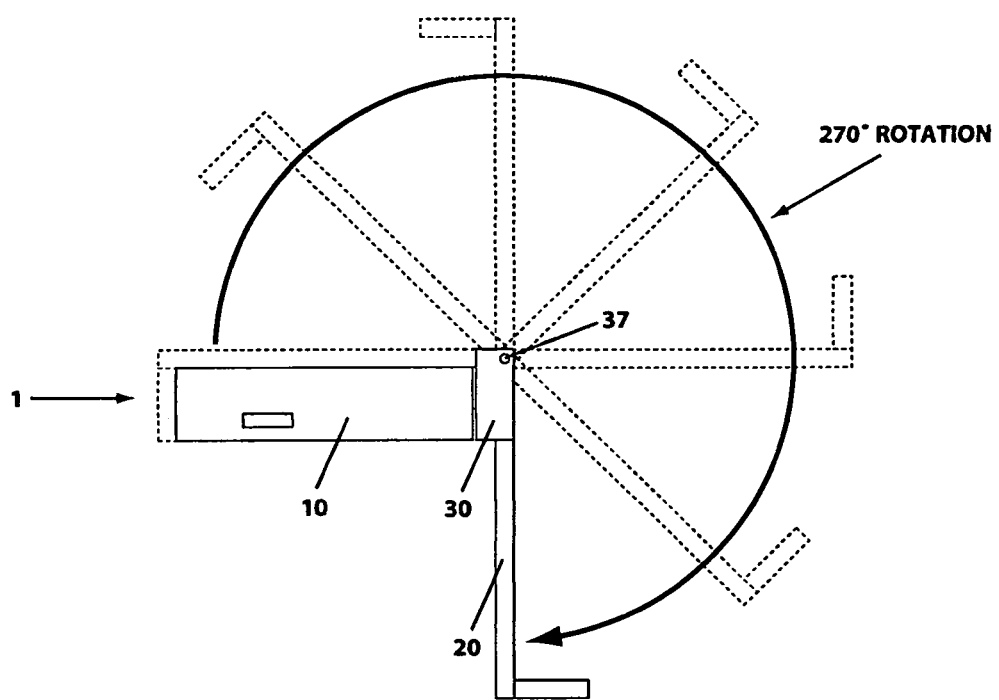
FIG. 3 is a side view of an embodiment of the manually-powerable flashlight that shows the crank arm rotating longitudinally from a resting position that is parallel to the longitudinal axis of the flashlight housing to an operating position 270° such that the crank arm is orthogonal with respect to the longitudinal axis of the flashlight housing.

FIG. 3 is a side view of an embodiment of the manually-powerable flashlight 1 that shows the crank arm 20 rotating longitudinally from a resting position that is parallel to the longitudinal axis of the flashlight housing to an operating position 270° such that the crank arm is orthogonal with respect to the longitudinal axis of the flashlight housing 10. Ultimately, the rotation of the crank arm is stopped at the 270° position as the top surface of the crank arm (as the arm oriented in the resting position) comes a full stop against the rear facing aspect 35 of the rotation channel 32 (as may be seen in FIG. 7).

Figure 4:
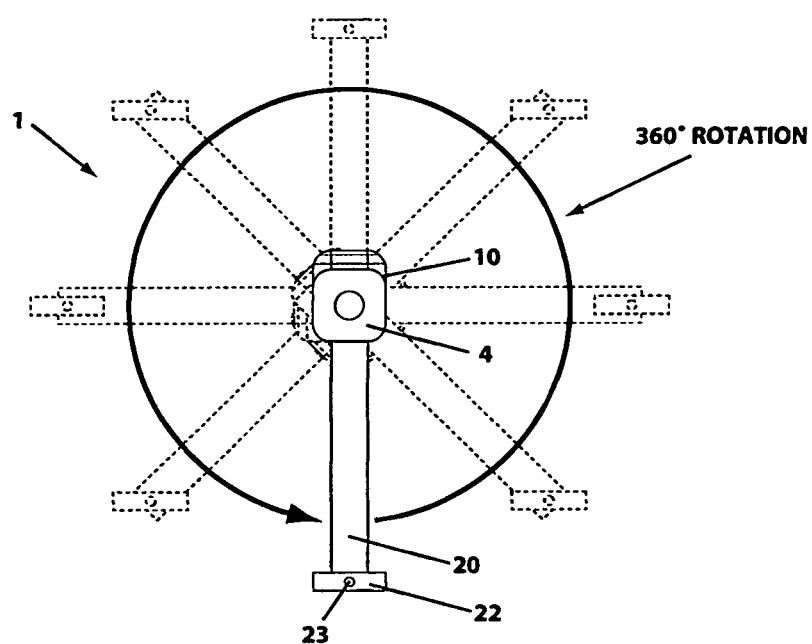
FIG. 4 is a front view of an embodiment of the manually powerable flashlight that shows the crank arm in its operating position (orthogonal with respect to the longitudinal axis of the flashlight housing) rotating freely through 360° axially around the longitudinal axis of the flashlight housing.

FIG. 4 is a front view of an embodiment of the manually powerable flashlight 1 that shows the crank arm 20 in its operating position (orthogonal with respect to the longitudinal axis of the flashlight housing 10) rotating freely through 360° in a counter-clockwise direction, axially around the longitudinal axis of the flashlight housing. The front end 40 of flashlight housing 10 is shown in the center of the figure; crank arm 20 is shown in a solid rendering at 6:00 o'clock, and in a ghosted rendering is shown rotating around the longitudinal axis of the flashlight through a 360° rotation.

Figure 5:
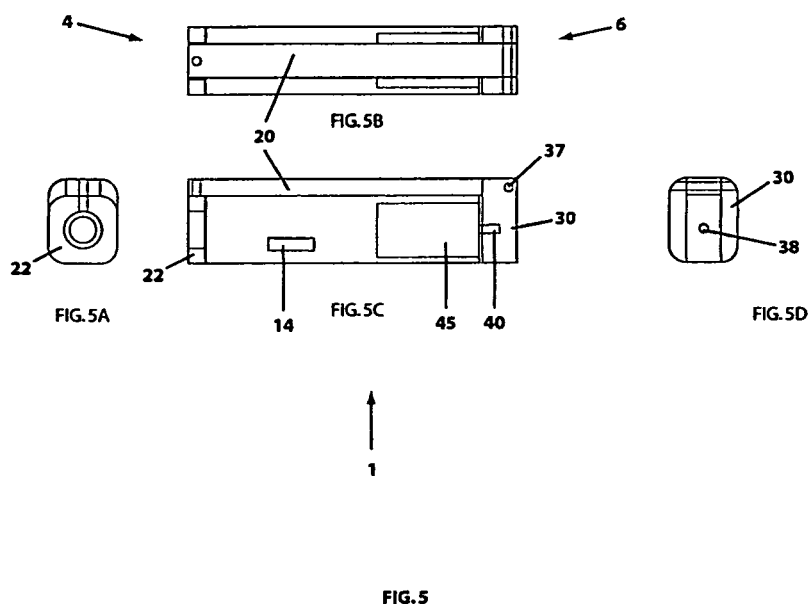
FIGS. 5A-5D provide various views of an embodiment of the manually powerable flashlight with the crank arm in a resting position.
Figure 6:
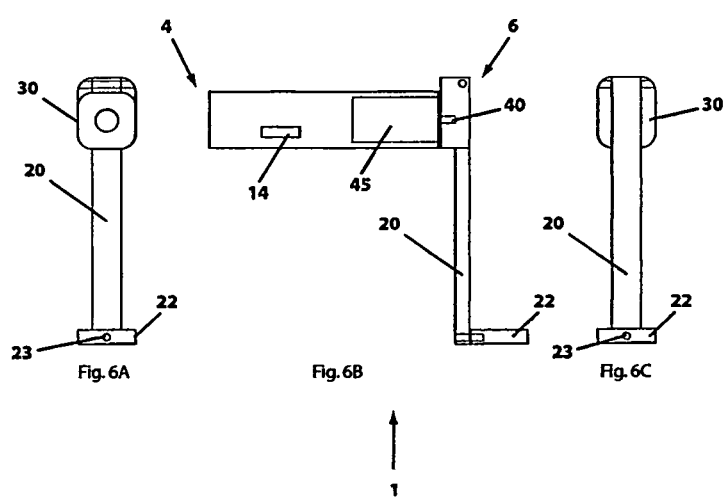
FIGS. 6A-6C provide various views of an embodiment of the manually powerable flashlight with the crank arm in an operating position.

FIGS. 5 and 6 provide various views of an embodiment of the manually powerable flashlight with the crank arm respectively in a resting position (FIG. 5) and in an operating position (FIG. 6). FIGS. 5A-5D provide various views of an embodiment of the manually powerable flashlight 1 with the crank arm 20 in a resting position. FIG. 5A is a front view, FIG. 5B is a top view, FIG. 5C is an exposed side view, and FIG. 5D is a rear view. FIG. 5C shows a generator 45 in a ghosted view, as it resides within the flashlight housing 10; see FIG. 8 for a more detailed exposed view of the generator and its connection to axel 40, as it is driven by rotation of the hinge element. FIGS. 6A-6C provide various views of an embodiment of the manually powerable flashlight 1 with the crank arm 20 in an operating position, which is 270° rotated from its resting position. FIG. 6A is front view, FIG. 6B is a side view, and FIG. 6C is a rear view.

Figure 7:
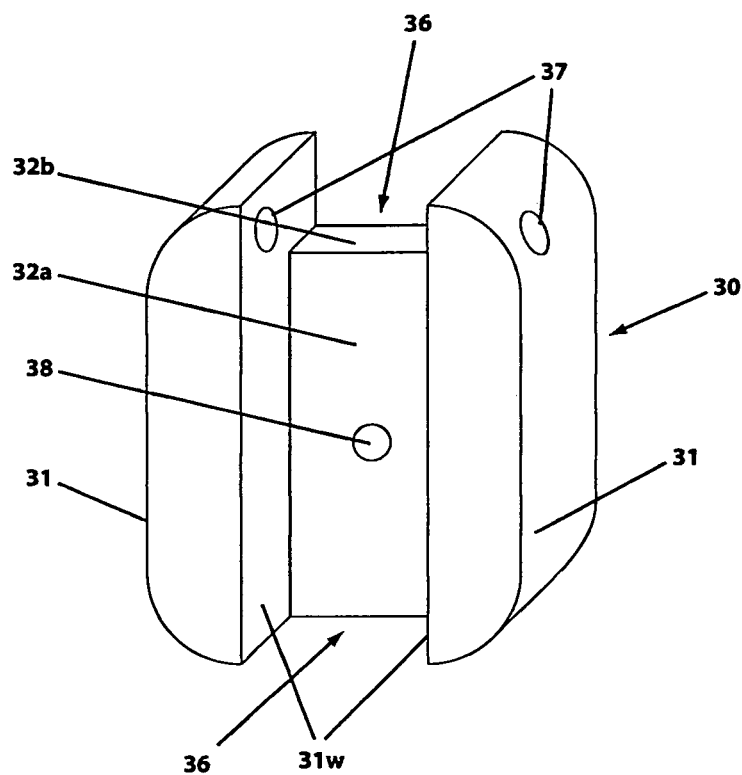
FIG. 7 is a perspective view of an embodiment of a hinge element of a manually powerable flashlight.

FIG. 7 is a perspective view of an embodiment of a hinge element 30 of a manually powerable flashlight. Major structural elements include side pieces 31 and centrally disposed connecting piece 32. The side pieces 31 form internally facing walls 31w. Connecting piece 32 has a side-facing surface 32a and a rear facing surface 32b. The surfaces 31w, 32a, and 32b collectively form a rotation channel 36, that accommodates the rear portion of the crank arm and allows rotation of the crank arm therein, and limits the rotation to an arc of about 270°. Surface 32a provides a rotation limit that defines the resting position of the crank arm. Surface 32b provides a rotation limit that defines the operating position of the crank arm.

Holes 37 in the side pieces are configured to accommodate a pin that passes through a rear aspect of the crank arm, about which the crank arm can rotate in an arc that is within the longitudinal plane defined by the longitudinal axis of the flashlight. Hole 38 accommodates an axel and attaches it to the hinge element. At its forward connection, axel 40 drives a generator, as seen in FIG. 8.

Figure 8:
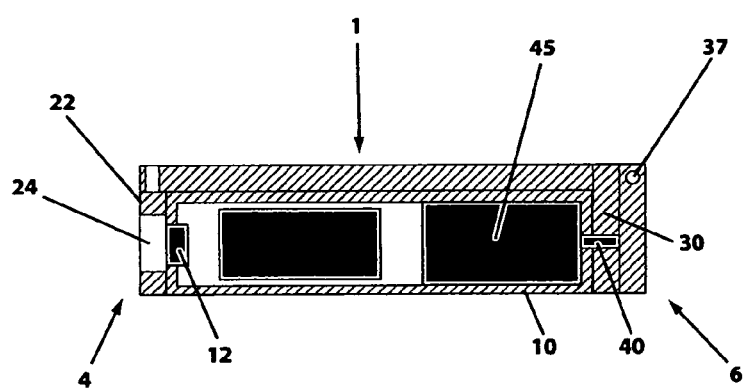
FIG. 8 is an exposed side view of an embodiment of the manually-powerable flashlight showing an axel connected at its base to the hinge element, such axel operably connected to a generator or capacitor contained within the flashlight housing.

FIG. 8 is an exposed side view of an embodiment of the manually-powerable flashlight 1 showing an axel 40 connected at its base to the hinge element 30, such axel operably connected to a generator or capacitor contained within the flashlight housing 10.

Figure 9:
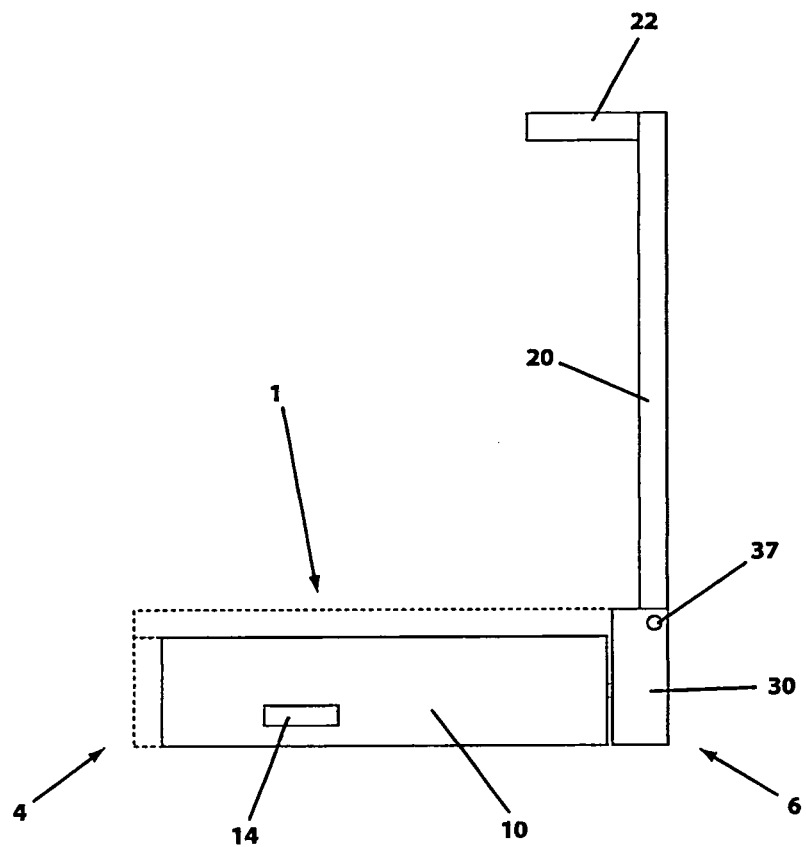
FIG. 9 is a side view of an embodiment of the manually powerable flashlight showing an alternative operating position for the crank arm at an angle of 90° from the longitudinal axis of the flashlight housing.

FIG. 9 is a side view of an embodiment of the manually powerable flashlight 1 showing an alternative operating position for the crank arm 20 at an angle of 90° from the longitudinal axis of the flashlight housing 10.

Figure 10:
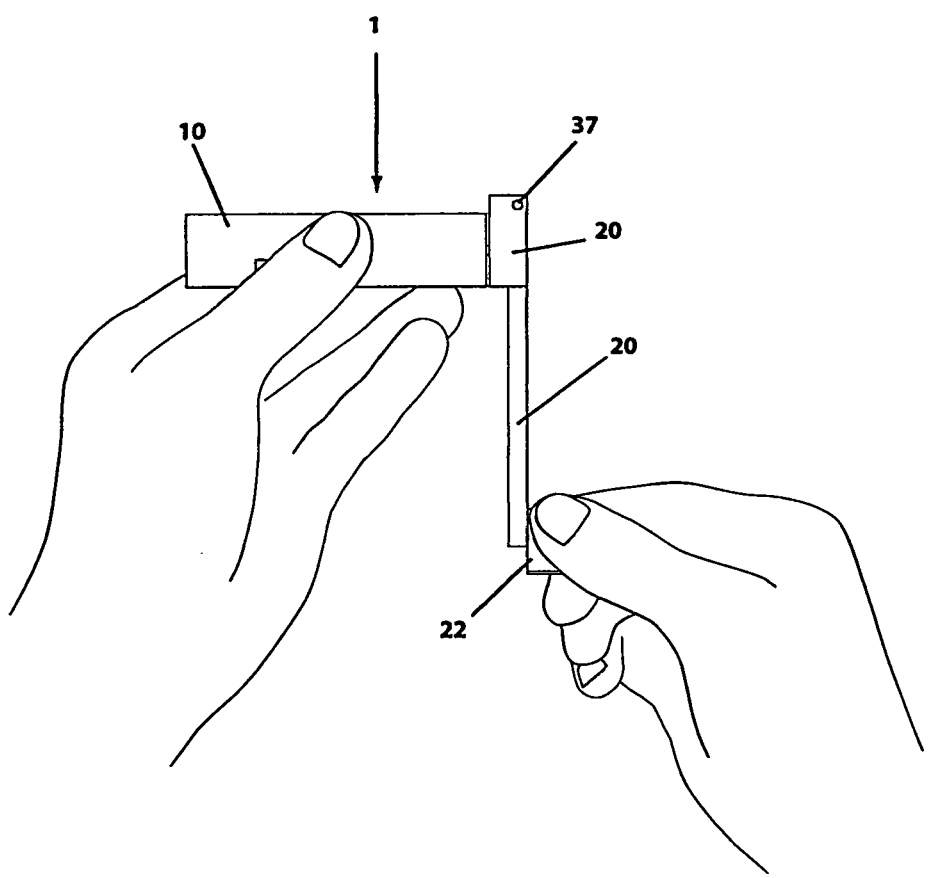
FIG. 10 provides a view of a user providing manual power to an embodiment of a manually powerable flashlight.

FIG. 10 provides a view of a user providing manual power to an embodiment of a manually powerable flashlight 1. In this view, the crank arm 20 is in an operating position, longitudinally rotated 270° from its resting position. The operator is in the process of rotating crank 20 axially, around the longitudinal axis of the flashlight. This figure depicts ergonomic aspects of the flashlight and its crank arm. The flashlight is small, but sufficiently large that an operator can handle it easily in a holding hand (the left hand, in this depiction). Similarly, the crank is sufficiently large that the operator can easily turn it with an operating hand (the right hand, in this depiction). Given the constraints of the design, the crank arm is of typically of maximal length, providing maximal leverage for the operator.

Unless defined otherwise, all technical terms used herein have the same meanings as commonly understood by one of ordinary skill in the medical arts. Specific methods, devices, and materials may be described in this application, but any methods and materials similar or equivalent to those described herein can be used in the practice of the present invention. While embodiments of the invention have been described in some detail and by way of illustrations, such illustrations are for purposes of clarity of understanding only, and are not intended to be limiting. Various terms have been used in the description to convey an understanding of the invention; it will be understood that the meaning of these various terms extends to common linguistic or grammatical variations thereof. Further, while some theoretical considerations may have been advanced in furtherance of providing an understanding of the technology, such as ergonomic aspects of the invention, the appended claims to the invention are not bound by such theory. Moreover, any one or more features of any embodiment of the invention can be combined with any one or more other features of any other embodiment of the invention, without departing from the scope of the invention. Still further, it should be understood that the invention is not limited to the embodiments that have been set forth for purposes of exemplification, but is to be defined only by a fair reading of claims appended to the patent application, including the full range of equivalency to which each element thereof is entitled.

What is claimed is:

1. A manually powerable flashlight comprising:
   a flashlight housing comprising a back end, a front end, a longitudinal axis, and a light-projecting element positioned on the front end;
   a hinge element disposed at the back end of the housing; and
   a crank arm comprising a free end and an attached end, the attached end rotatably attached to the hinge element;
   wherein the hinge element is operable to allow the crank arm to rotate within an arc of about 270° between a resting position and an operating position, the arc disposed in a plane that includes the longitudinal axis of the housing, the resting position being such that the crank arm is aligned parallel to the housing and the operating position being such that the crank arm is orthogonal to the housing,
   wherein the hinge element is rotatable around the longitudinal axis of the housing, thereby rendering the crank arm rotatable around the longitudinal axis of the housing, and wherein the hinge element is operably connectable to a generator disposed within the housing such that rotation of the hinge element powers the generator, the generator being arranged to power the light-projecting element.

2. The flashlight of claim 1, wherein the crank arm, is rotatably stabilizable in the resting position.

3. The flashlight of claim 2, wherein the crank arm is rotatably stabilizable in the resting position by a mechanism that engages the arm to the housing.

4. The flashlight of claim 2, wherein the crank arm is rotatably stabilizable in the resting position by a mechanism that engages the attached end arm within the hinge element.

5. The flashlight of claim 1, wherein the crank arm is rotatably stabilizable in the operating position.

6. The flashlight of claim 5, wherein the crank arm is rotatably stabilizable in the operating position by a mechanism that engages the attached portion of the crank arm within the hinge element.

7. The flashlight of claim 1, wherein the crank arm, when in an operating position and disposed orthogonal to the longitudinal axis of the housing, is rotatable with respect to the longitudinal axis of the flashlight housing.

8. The flashlight of claim 1, wherein the free end of the crank arm comprises an end element which, when the crank arm is in a resting position, covers the light-producing element.

9. The flashlight of claim 8, wherein the end element of the crank arm comprises an opening that allows projection of light from the light-producing element when the crank arm is in a resting position.

10. The flashlight of claim 8, wherein the end element of the crank arm comprises a mechanism that stabilizes the crank arm in the resting position.

11. The flashlight of claim 8, wherein the end element is attached to the unattached end of the crank arm by a hinged mechanism.

12. The flashlight of claim 1, wherein the crank arm and the housing of the flashlight are substantially of the same length.

13. The flashlight of claim 1, wherein the hinge element comprises a channel that laterally embraces the crank arm, the crank arm being rotatable within the channel.

14. The flashlight of claim 1, wherein the housing of the flashlight has a cross sectional area in the range of about 0.36 in$^2$ to about 2.5 in$^2$.

15. The flashlight of claim 1, further comprising a power storage unit to store power, said power deliverable by operation of the crank arm.

16. The flashlight of claim 15, wherein the housing further comprises a USB power port, the power port arranged to deliver electrical charge to the power storage unit.

17. An electrically powered hand-held device comprising:
an elongate housing comprising a back end, a front end, a longitudinal axis, and a power-requiring functional element;
a hinge element disposed at the back end of the housing; and
a crank arm comprising a free end and an attached end, the attached end rotatably attached to the hinge element;
wherein the hinge element is operable to allow the crank arm to rotate within an arc of about 270° between a resting position and an operating position, the arc disposed in a plane that includes the longitudinal axis of the housing, the resting position being such that the crank arm is aligned parallel to the housing and the operating position being such that the crank arm is orthogonal to the housing,
wherein the hinge element is rotatable around the longitudinal axis of the housing, thereby rendering the crank arm rotatable around the longitudinal axis of the housing, and
wherein the hinge element is operably connectable to a generator disposed within the housing such that rotation of the hinge element powers the generator, the generator being arranged to provide power to the power-requiring functional element.

18. A manually powerable energy storage and delivery unit comprising:
an elongate housing comprising a back end, a front end, a longitudinal axis, and a power delivery connector connectable to a power-requiring device;
a hinge element disposed at the back end of the housing;
a crank arm comprising a free end and an attached end, the attached end rotatably attached to the hinge element;
wherein the hinge element is operable to allow the crank arm to rotate within an arc of about 270° between a resting position and an operating position, the arc disposed in a plane that includes the longitudinal axis of the housing, the resting position being such that the crank arm is aligned parallel to the housing and the operating position being such that the crank arm is orthogonal to the housing,
wherein the hinge element is rotatable around the longitudinal axis of the housing, thereby rendering the crank arm rotatable around the longitudinal axis of the housing, and
wherein the hinge element is operably connectable to a generator disposed within the housing such that rotation of the hinge element powers the generator, the generator operably connected to the power delivery connector.

* * * * *